(12) United States Patent
Du et al.

(10) Patent No.: US 11,832,215 B2
(45) Date of Patent: *Nov. 28, 2023

(54) COMMUNICATION METHOD BETWEEN CORE NETWORK DEVICE AND TERMINAL IN COMMUNICATION SYSTEM

(71) Applicant: HUAWEI TECHNOLOGIES CO., LTD., Guangdong (CN)

(72) Inventors: Jun Du, Shanghai (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,383

(22) Filed: Aug. 5, 2022

(65) Prior Publication Data
US 2022/0386390 A1 Dec. 1, 2022

Related U.S. Application Data

(63) Continuation of application No. 16/587,034, filed on Sep. 29, 2019, now Pat. No. 11,412,477, which is a (Continued)

(51) Int. Cl.
*H04W 68/00* (2009.01)
*H04W 4/029* (2018.01)
(Continued)

(52) U.S. Cl.
CPC ......... *H04W 68/005* (2013.01); *H04W 4/029* (2018.02); *H04W 36/0033* (2013.01);
(Continued)

(58) Field of Classification Search
CPC . H04W 4/029; H04W 36/0033; H04W 68/02; H04W 76/27; H04W 76/30
See application file for complete search history.

(56) References Cited

U.S. PATENT DOCUMENTS 9,642,043 B1 * 5/2017 Drailing ............... H04W 68/02
2009/0059829 A1 * 3/2009 Bachmann ........ H04W 52/0235
370/311
(Continued)

FOREIGN PATENT DOCUMENTS

CN 101094504 12/2007
CN 102448026 5/2012
(Continued)

OTHER PUBLICATIONS

ASUSTeK, "On the paging area management for light connection," 3GPP TSG-RAN WG2 Meeting #95, R2-165303, Gothenburg, Sweden, Aug. 22-26, 2016, 4 pages.
(Continued)

*Primary Examiner* — Hashim S Bhatti
(74) *Attorney, Agent, or Firm* — Fish & Richardson P.C.

(57) ABSTRACT

Embodiments of the present application provide communication methods and systems. One method comprises receiving, from a first access network device, signaling destined for a terminal device, wherein the terminal device is in a radio resource control (RRC) inactive mode. A first paging message is sent to a second access network device for paging the terminal device and first indication information is received indicating that the terminal device is connected to a second access network device. After receiving the signaling destined for the terminal device, the first access network device can learn the terminal device has connected to the second access network device, and therefore performs proper subsequent processing.

16 Claims, 8 Drawing Sheets

Related U.S. Application Data continuation of application No. 16/361,224, filed on Mar. 22, 2019, now Pat. No. 10,455,541, which is a continuation of application No. PCT/CN2016/100828, filed on Sep. 29, 2016.

(51) Int. Cl.

| | | |
|---|---|---|
| *H04W 36/00* | (2009.01) | |
| *H04W 76/27* | (2018.01) | |
| *H04W 68/02* | (2009.01) | |
| *H04W 76/30* | (2018.01) | |
| *H04W 76/10* | (2018.01) | |
| *H04W 88/02* | (2009.01) | |
| *H04W 60/06* | (2009.01) | |
| *H04W 60/04* | (2009.01) | |
| *H04W 36/08* | (2009.01) | |
| *H04W 48/20* | (2009.01) | |
| *H04W 88/08* | (2009.01) | |
| *H04W 68/10* | (2009.01) | |

(52) U.S. Cl.
CPC ............ *H04W 68/00* (2013.01); *H04W 68/02* (2013.01); *H04W 76/10* (2018.02); *H04W 76/27* (2018.02); *H04W 76/30* (2018.02); *H04W 36/08* (2013.01); *H04W 48/20* (2013.01); *H04W 60/04* (2013.01); *H04W 60/06* (2013.01); *H04W 68/10* (2013.01); *H04W 88/02* (2013.01); *H04W 88/08* (2013.01)

(56) References Cited

U.S. PATENT DOCUMENTS

| | | | | |
|---|---|---|---|---|
| 2014/0274047 | A1* | 9/2014 | Dhanda | H04W 68/005 |
| | | | | 455/458 |
| 2014/0321371 | A1* | 10/2014 | Anderson | H04W 76/19 |
| | | | | 370/329 |
| 2015/0080034 | A1 | 3/2015 | Xi et al. | |
| 2016/0234877 | A1* | 8/2016 | Bangolae | H04W 4/70 |
| 2017/0332419 | A1* | 11/2017 | Kim | H04W 74/0833 |
| 2018/0175932 | A1* | 6/2018 | Lucky | H04B 7/2041 |
| 2018/0295603 | A1* | 10/2018 | Saily | H04W 68/005 |
| 2019/0124710 | A1* | 4/2019 | Stattin | H04W 12/50 |
| 2019/0166576 | A1* | 5/2019 | Kim | H04W 24/10 |
| 2019/0174570 | A1* | 6/2019 | Fujishiro | H04W 76/27 |

FOREIGN PATENT DOCUMENTS

| | | |
|---|---|---|
| CN | 102480785 | 5/2012 |
| CN | 102835162 | 12/2012 |
| CN | 103428853 | 12/2013 |
| CN | 107623946 | 1/2018 |
| JP | 2013143664 | 7/2013 |
| KR | 20160098394 | 8/2016 |
| WO | WO2011066801 | 6/2011 |
| WO | WO2012042378 | 4/2012 |
| WO | WO2016002692 | 1/2016 |

OTHER PUBLICATIONS

Ericsson, "RRC Suspend/Resume for Light Connection," 3GPP Draft, R2-165561, Aug. 21, 2016, 6 pages.

Huawei et al., "DL Signalling Triggered RAN based Paging," 3GPP Draft, R3-162159, Sep. 30, 2016, 3 pages.

Huawei et al., "Evaluation on RAN Initialed Paging and MME Initialed Paging," 3GPP Draft, R2-163930, May 22, 2016, 12 pages.

Huawei et al., "Signalling reduction to enable light connection for LTE," 3GPP TSG RAN meeting #73, RP-161805, New Orleans, USA, Sep. 19-22, 2016, total 6 pages.

Huawei, "Context fetch in light connection," 3GPP TSG-RAN WG3 #93 R3-161721, Gothenburg, Sweden, Aug. 22-26, 2016, total 3 pages.

Huawei, "RAN initialed paging," 3GPP TSG-RAN WG3 #93 R3-161720, Gothenburg, Sweden, Aug. 22-26, 2016, total 4 pages.

Huawei, HiSilicon, "Procedure for transition between normal RRC connection and light RRC connection," 3GPP TSG-RAN WG2#95, R2-165248, Gothenburg, Sweden, Aug. 22-26, 2016, 3 pages.

Huawei, HiSilicon, "RAN2 impact of Context fetch in light connection," 3GPP TSG-RAN WG2 Meeting #95, R2-165249, Gothenburg, Sweden, Aug. 22-26, 2016, 3 pages.

Huawei, HiSilicon, "The functions of light connection," 3GPP TSG-RAN WG2 Meeting #95, R2-165246, Gothenburg, Sweden, Aug. 22-26, 2016, 5 pages.

Huawei, HiSilicon, China Telecom, "On RAN initialed paging," 3GPP TSG-RAN WG2#94 R2-163932, Nanjing, China, May 23-27, 2016, total 5 pages.

Intel Corporation, "Details of Lightly Connected UEs," 3GPP TSG-RAN WG2 Meeting #95, R2-164986, Gothenburg, Sweden, Aug. 22-26, 2016, 4 pages.

Intel Corporation, "Light connection DRX paging cycle and mechanism," 3GPP TSG RAN WG2 Meeting #94, R2-163632, Nanjing, China, May 23-27, 2016, 5 pages.

Intel Corporation, "Mobility support for lightly connected UE," 3GPP TSG RAN WG2 Meeting #95, R2-164987, Gothenburg, Sweden, Aug. 22-26, 2016, total 5 pages.

Office Action issued in Japanese Application No. 2021-000755 dated May 10, 2022, 14 pages (with English translation).

Samsung, "Design principles and considerations for the LTE light connection," 3GPP TSG-RAN WG2 Meeting #95, R2-164677, Gothenburg, Sweden, Aug. 22-26, 2016, total 5 pages.

3GPP TS 36.300 V15.6.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Jun. 2019, 365 pages.

3GPP TS 36.331 V13.2.0, "3rd Generation Partnership Project; Technical Specification Group Radio Access Network; Evolved Universal Terrestrial Radio Access (E-UTRA); Radio Resource Control (RRC); Protocol specification (Release 13)," Jun. 2016, 623 pages.

\* cited by examiner

COMMUNICATION METHOD BETWEEN CORE NETWORK DEVICE AND TERMINAL IN COMMUNICATION SYSTEM

CROSS-REFERENCE TO RELATED APPLICATIONS

This application is a continuation of U.S. patent application Ser. No. 16/587,034, filed on Sep. 29, 2019, which is a continuation of U.S. patent application Ser. No. 16/361,224, filed on Mar. 22, 2019, now U.S. Pat. No. 10,455,541, which is a continuation of International Application No. PCT/CN2016/100828, filed on Sep. 29, 2016. All of the aforementioned patent applications are hereby incorporated by reference in their entireties.

TECHNICAL FIELD

The present application relates to the field of communication technologies, and in particular, to a communication method, a device, and a system.

BACKGROUND

In a wireless communication system, a terminal may connect to a core network by using a radio access network (RAN). For example, the terminal may connect to a core network device on the core network by using an access network device in the RAN. By using the access network device, the core network device may send signaling to the terminal and receive a corresponding response. However, when the terminal moves out of coverage area of the access network device, the terminal will not receive the signaling of the core network device, and therefore cannot perform proper subsequent processing.

SUMMARY

Embodiments of the present application provide a communication method, in order to resolve a problem that a terminal cannot perform proper subsequent processing when it no longer receives signaling of a core network device.

According to an aspect, an embodiment of the present application provides a communication method, where the method is applied to a communication system, the communication system includes a paging area, there are at least a first access network device and a second access network device in the paging area, there is a communication link between the first access network device and a core network device, and the method includes: receiving, by the first access network device from the core network device, signaling destined for a terminal; sending, by the first access network device, a first paging message to the second access network device, where the first paging message is used to page the terminal; sending, by the second access network device, a second paging message to the terminal; receiving, by the second access network device, a paging response from the terminal; and sending, by the second access network device, first indication information to the first access network device, where the first indication information is used to indicate that the terminal has connected to the second access network device. In this embodiment of the present application, after receiving the signaling destined for the terminal sent by the core network device, the first access network device sends the first paging message to the second access network device, and when receiving the first indication message sent by the second access network device, can learn that the terminal has connected to the second access network device, and therefore performs proper subsequent processing.

That there are at least a first access network device and a second access network device in the paging area may be: there are the first access network device and the second access network device in the paging area, or there is another access network device in the paging area in addition to the first access network device and the second access network device. That there are the first access network device and the second access network device in the paging area means that some or all cells of the first access network device and some or all cells of the second access network device belong to the paging area.

The signaling may include at least one of the following: non-access stratum (NAS) signaling, radio bearer management signaling, terminal context modification signaling, terminal context deletion signaling, location report signaling, tracking signaling, or location service (LCS) signaling. For example, the first access network device may receive a context modification command from the core network device, and send a radio resource control (RRC) reconfiguration command to the terminal based on the context modification command, to modify a context of the terminal. For another example, the first access network device may receive NAS signaling from the core network device, and then forward the NAS signaling to the terminal.

In a possible design, the first access network device may send the first paging message to the second access network device when no paging response is received from the terminal. In a possible design, the first access network device may receive a terminal information indication message from the second access network device, where the terminal information indication message carries the first indication information; or the first access network device may receive a terminal context request message from the second access network device, where the terminal context request message carries the first indication information.

In a possible design, the first access network device may further send second indication information to the core network device, where the second indication information is used to indicate that the terminal has moved out of coverage of the first access network device. For example, the first access network device may send a response message for the signaling to the core network device, where the response message carries the second indication information. For another example, the first access network device may send a signaling failure message to the core network device, where the signaling failure message carries the second indication information, and is used to indicate that the signaling is not sent successfully.

The second indication information may include one or all of information about the second access network device and status information of the terminal, where the status information is used to indicate a status of the terminal. For example, the status of the terminal may be: when the terminal moves within the paging area, an interface between the terminal and the core network device remains at the first access network device. For another example, the status of the terminal may be: the terminal can maintain a connection context, and perform cell reselection based on mobility. For another example, the status of the terminal may be a lightly connected mode, where the lightly connected mode may also be referred to as an inactive mode, a deactivated mode, a low active mode, a low overhead mode, or the like.

In a possible implementation, after sending the first indication information to the first access network device, the second access network device may further receive, from the core network device, the signaling destined for the terminal. Optionally, before receiving the signaling, the second access network device may further send a path switching request to the core network device.

In a possible design, the first access network device may alternatively send the signaling to the second access network device. For example, the first access network device may send a context transfer message to the second access network device, where the context transfer message carries the signaling.

In a possible implementation, the first access network device may further receive a first signaling processing indication from the second access network device, where the first signaling processing indication is used to indicate that processing of the signaling succeeds or fails. For example, the first access network device may receive a context transfer acknowledgment message from the second access network device, where the context transfer acknowledgment message carries the first signaling processing indication. Further, the first access network device may send a second signaling processing indication to the core network device, where the second signaling processing indication is used to indicate that processing of the signaling succeeds or fails.

In a possible design, the second access network device may alternatively send the signaling to the terminal.

According to another aspect, an embodiment of the present application provides a communication method, where the method is applied to a communication system, the communication system includes a paging area, there are at least a first access network device and a second access network device in the paging area, there is a communication link between the first access network device and a core network device, and the method includes: sending, by the core network device, signaling destined for a terminal to the first access network device; receiving, by the core network device, second indication information from the first access network device, where the second indication information is used to indicate that the terminal has moved out of coverage of the first access network device, and sending, by the core network device, the signaling to the second access network device. In this embodiment of the present application, after sending the signaling to the first access network device, the core network device can receive the second indication information from the first access network device, and therefore, can learn, according to the second indication information, that the terminal has moved out of the coverage of the first access network device, and send the signaling to the second access network device for proper subsequent processing.

That there are at least a first access network device and a second access network device in the paging area may be: there are the first access network device and the second access network device in the paging area, or there is another access network device in the paging area in addition to the first access network device and the second access network device. That there are the first access network device and the second access network device in the paging area means that some or all cells of the first access network device and some or all cells of the second access network device belong to the paging area.

The signaling may include at least one of the following: non-access stratum NAS signaling, radio bearer management signaling, terminal context modification signaling, terminal context deletion signaling, location report signaling, tracking signaling, or location service (LCS) signaling.

In a possible design, the core network device may receive, from the first access network device, a response message for the signaling, where the response message carries the second indication information; or the core network device may receive a signaling failure message from the first access network device, where the signaling failure message carries the second indication information, and is used to indicate that the signaling is not sent successfully.

The second indication information may include one or all of information about the second access network device and status information of the terminal, where the status information is used to indicate a status of the terminal. For example, the status of the terminal may be: when the terminal moves within the paging area, an interface between the terminal and the core network device remains at the first access network device. For another example, the status of the terminal may be: the terminal can maintain a connection context, and perform cell reselection based on mobility. For another example, the status of the terminal may be a lightly connected mode.

In a possible design, after receiving the second indication information from the first access network device, the core network device may further send the signaling to the second access network device. For example, the core network device may send the signaling to the second access network device based on the information about the second access network device. For another example, the core network device may send the signaling to the second access network device after receiving a path switching request sent by the second access network device.

According to still another aspect, an embodiment of the present application provides a first access network device, where the first access network device has a function of implementing the actions of the first access network device in the foregoing method examples. The function may be implemented by hardware, or may be implemented by executing corresponding software by using hardware. The hardware or the software includes one or more modules corresponding to the foregoing function.

In a possible design, the first access network device includes a processor, where the processor is configured to enable the first access network device to perform a corresponding function in the foregoing methods. Further, the first access network device may further include a communication interface, where the communication interface is configured to support communication between the first access network device and a second access network device or a core network device. Further, the first access network device may further include a memory, where the memory is configured to be coupled with the processor, and the memory stores a program instruction and data necessary for the first access network device.

According to yet another aspect, an embodiment of the present application provides a second access network device, where the second access network device has a function of implementing the actions of the second access network device in the foregoing method examples. The function may be implemented by hardware, or may be implemented by executing corresponding software by using hardware. The hardware or the software includes one or more modules corresponding to the foregoing function.

In a possible design, the second access network device includes a processor, where the processor is configured to enable the second access network device to perform a corresponding function in the foregoing methods. Further, the second access network device may further include a communication interface, a transmitter, and a receiver, where the communication interface is configured to support communication between the second access network device and a first access network device or a core network device, and the transmitter and the receiver are configured to support communication between the second access network device and a terminal. Further, the second access network device may further include a memory, where the memory is configured to be coupled with the processor, and the memory stores a program instruction and data necessary for the second access network device.

According to still yet another aspect, an embodiment of the present application provides a core network device, where the core network device has a function of implementing the actions of the core network device in the foregoing method examples. The function may be implemented by hardware, or may be implemented by executing corresponding software by using hardware. The hardware or the software includes one or more modules corresponding to the foregoing function.

In a possible design, the core network device includes a processor, where the processor is configured to enable the core network device to perform a corresponding function in the foregoing methods. Further, the core network device may further include a communication interface, where the communication interface is configured to support communication between the core network device and a first access network device or a second access network device. Further, the core network device may further include a memory, where the memory is configured to be coupled with the processor, and the memory stores a program instruction and data necessary for the core network device.

According to a further aspect, an embodiment of the present application provides a communication system, where the system includes the first access network device and the second access network device in the foregoing aspects, or the system includes the first access network device, the second access network device, and the core network device in the foregoing aspects.

According to a still further aspect, an embodiment of the present application provides a computer storage medium, configured to store a computer software instruction used by the foregoing first access network device, where the computer software instruction includes a program designed for executing the foregoing aspects.

According to a yet further aspect, an embodiment of the present application provides a computer storage medium, configured to store a computer software instruction used by the foregoing second access network device, where the computer software instruction includes a program designed for executing the foregoing aspects.

According to a still yet further aspect, an embodiment of the present application provides a computer storage medium, configured to store a computer software instruction used by the foregoing core network device, where the computer software instruction includes a program designed for executing the foregoing aspects.

Compared with the prior art, in the solutions in the embodiments of the present application, after receiving the signaling destined for the terminal sent by the core network device, the first access network device sends the first paging message to the second access network device, and when receiving the first indication message sent by the second access network device, can learn that the terminal has connected to the second access network device, and therefore performs proper subsequent processing.

BRIEF DESCRIPTION OF DRAWINGS

The following briefly introduces the accompanying drawings used in describing the embodiments or the prior art.

DESCRIPTION OF EMBODIMENTS

The following describes the technical solutions in the embodiments of the present application with reference to the accompanying drawings.

Network architecture and application scenarios described in the embodiments of the present application are intended to describe the technical solutions in the embodiments of the present application more clearly, and do not constitute any limitation on the technical solutions provided in the embodiments of the present application. With evolution of network architectures and emergence of new application scenarios, the technical solutions provided in the embodiments of the present application may also be applicable to similar technical problems.

Figure 1:
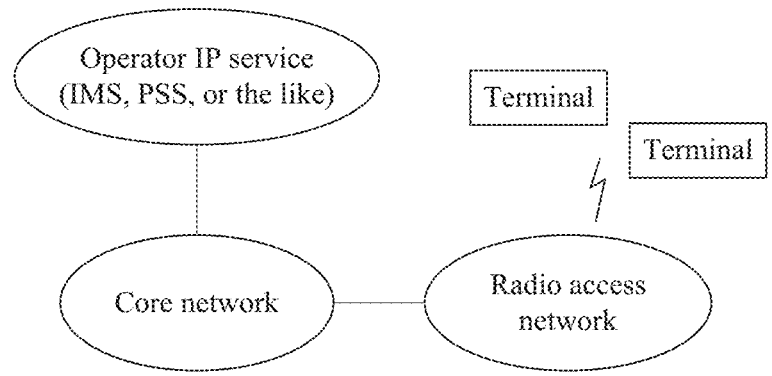
FIG. 1 is a schematic diagram of a possible application scenario according to an embodiment of the present application.
Figure 2:
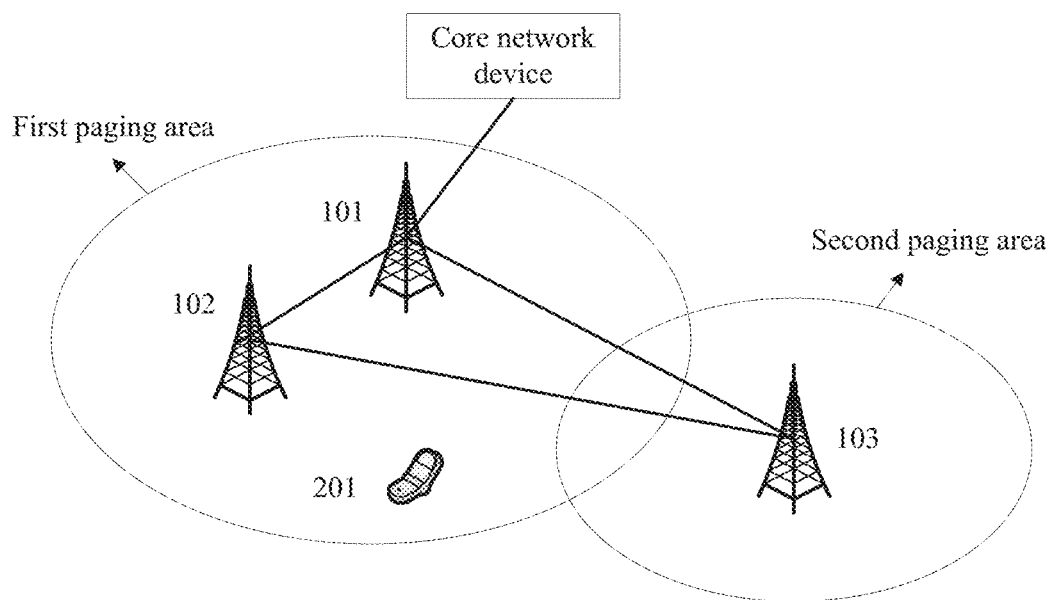
FIG. 2 is a schematic diagram of a possible network architecture according to an embodiment of the present application.

The following first describes, with reference to FIG. 1 and FIG. 2, some possible application scenarios and network architectures to which the embodiments of the present application are applicable.

FIG. 1 shows one possible applicable application scenario according to an embodiment of the present application. As shown in FIG. 1, by using a radio access network and a core network, a terminal connects to an Internet Protocol (IP) service network of an operator, such as an IP multimedia subsystem (IMS) network or a packet switched streaming service (PSS) network. The technical solutions described in the present application may be applicable to a Long Term Evolution (LTE) system or other wireless communication systems that use various radio access technologies, for example, systems that use access technologies such as code division multiple access (CDMA), frequency division multiple access (FDMA), time division multiple access (TDMA), orthogonal frequency division multiple access (OFDMA), and single carrier frequency division multiple access (SC-FDMA). In addition, the technical solutions may be applicable to a subsequent evolved system of the LTE system, for example, a 5th Generation (5G) system. For clarity, only the LTE system is used as an example herein for description.

In the LTE system, an evolved universal terrestrial radio access network (E-UTRAN) is used as a radio access network, and an evolved packet core (EPC) is used as a core network. The terminal connects to an IMS network by using the E-UTRAN and the EPC. It should be noted that when the solutions in the embodiments of the present application are applied to the 5G system or other systems that may emerge in the future, names of a base station and a terminal might change. However, this does not affect the implementation of the solutions provided in the embodiments of the present application.

Based on the foregoing application scenario, FIG. 2 shows a possible network architecture according to an embodiment of the present application. As shown in FIG. 2, the network architecture includes a core network device, a terminal 201, and a plurality of access network devices 101, 102, 103. The access network device 101 and the access network device 102 are in a same paging area, for example, a first paging area. The access network device 103 is in another paging area, for example, a second paging area. The access network device 101 may be referred to as an anchor access network device in the first paging area. An anchor access network device is an access network device that stores context information of a terminal device, maintains a connection between the terminal and the core network device, and connects to the core network device and any other access network device in the first paging area.

In FIG. 2, the terminal 201 is in a lightly connected mode. A terminal is in a lightly connected mode means that an interface between the terminal and a core network device remains at an anchor access network device, and the terminal does not need to notify the anchor access network device when moving within a specific area, but needs to notify the anchor access network device when moving out of the specific area. For example, the terminal 201 may maintain an interface between the terminal 201 and the core network device by using the access network device 101 in the first paging area. The terminal 201 does not need to notify the access network device 101 when moving within the first paging area, and the terminal 201 notifies the access network device 101 only when moving out of the first paging area.

The lightly connected mode in the embodiments of the present application may be a sub-mode of a radio resource control (RRC) connected mode, an enhanced mode of an idle mode, or an independent mode. The lightly connected mode may also have another name. For example, the lightly connected mode may also be referred to as an inactive mode, a deactivated mode, a low active mode, a low overhead mode, or the like. The name or a form of the lightly connected mode is not limited in the embodiments of the present application. For ease of description, the following may use a first mode to describe the lightly connected mode.

A paging area in the embodiments of the present application is a name of a set of cells, and the set of cells is managed by an access network device. When moving within the paging area, the terminal does not need to notify the access network device that configured the paging area for the terminal. When moving out of the paging area, the terminal needs to notify the access network device. When an access network device in the paging area needs to communicate with the terminal device, the access network device needs to page the terminal in all cells included in the paging area. It should be noted that the paging area may also be referred to as a registration area of the terminal, a light connection area of the terminal, a management area of the terminal, an access network registration area of the terminal, a tracking area of the terminal, an access network tracking area of the terminal, or the like. This is not limited in the embodiments of the present application.

In the embodiments of the present application, terms "network" and "system" are often used alternately. The terminal in the embodiments of the present application may include a device with a wireless communication function such as a handheld device, an in-vehicle device, a wearable device, a computing device, or other processing devices connected to wireless modems, and various forms of user equipment (UE), mobile stations (MS), terminal devices, and the like. For ease of description, the devices mentioned above are collectively referred to as the terminal. The access network device in the embodiments of the present application is an apparatus that is deployed in a radio access network and that is configured to provide a wireless communication function for a terminal. For example, the access network device may be a base station (BS), and the base station may include various forms of macro base stations, micro base stations, relay stations, access points, and the like. In systems using a different radio access technology, a device having a base station function may have different names. For example, the device is referred to as an evolved NodeB (eNB or eNodeB) in a Long Term Evolution (LTE) system, or referred to as a NodeB in a third generation (3G) communication system. For ease of description, all the apparatuses that provide a wireless communication function for a terminal are collectively referred to as access network devices in the embodiments of the present application. The core network devices in the embodiments of the present application may include different devices in different systems. For example, in the LTE system, the core network device may include a mobility management entity (MME) or a serving gateway (SGW); in the 3G communication system, the core network device may include a serving GPRS support node (SGSN) or a gateway GPRS support node (GGSN). GPRS is an abbreviation for a general packet radio system. The core network device in the embodiments of the present application may also include a core network device in a 5G system or another system that may emerge in the future.

The following provides further details of the embodiments of the present application based on the foregoing common features.

In an existing technical solution, a terminal connects to a core network device by using an access network device. If the terminal moves out of coverage of the access network device (for example, the terminal in a handover process has not connected to a handed-over-to access network device, or the terminal in a lightly connected mode moves into coverage of another access network device in a same paging area), the terminal would not receive signaling of the core network device, and therefore cannot perform proper subsequent processing.

In view of this, the embodiments of the present application provide a communication method, and a device and a system that are based on the method. The method is applied to a communication system. The communication system includes a paging area. There are at least a first access network device and a second access network device in the paging area. There is a communication link between the first access network device and a core network device. The method includes: receiving, by the first access network device from the core network device, signaling destined for a terminal: sending, by the first access network device, a first paging message to the second access network device, where the first paging message is used to page the terminal: sending, by the second access network device, a second paging message to the terminal, receiving, by the second access network device, a paging response from the terminal; and sending, by the second access network device, first indication information to the first access network device, where the first indication information is used to indicate that the terminal has connected to the second access network device. In the embodiments of the present application, after receiving the signaling destined for the terminal sent by the core network device, the first access network device sends the first paging message to the second access network device, and when receiving the first indication information sent by the second access network device, can learn that the terminal has connected to the second access network device, and therefore performs proper subsequent processing.

It should be noted that the second access network device may be any access network device in the paging area other than the first access network device.

Understandably, that there are at least a first access network device and a second access network device in the paging area may be: there are the first access network device and the second access network device in the paging area, or there is another access network device in the paging area in addition to the first access network device and the second access network device. That there are the first access network device and the second access network device in the paging area means that some or all cells of the first access network device and some or all cells of the second access network device belong to the paging area.

Figure 3:
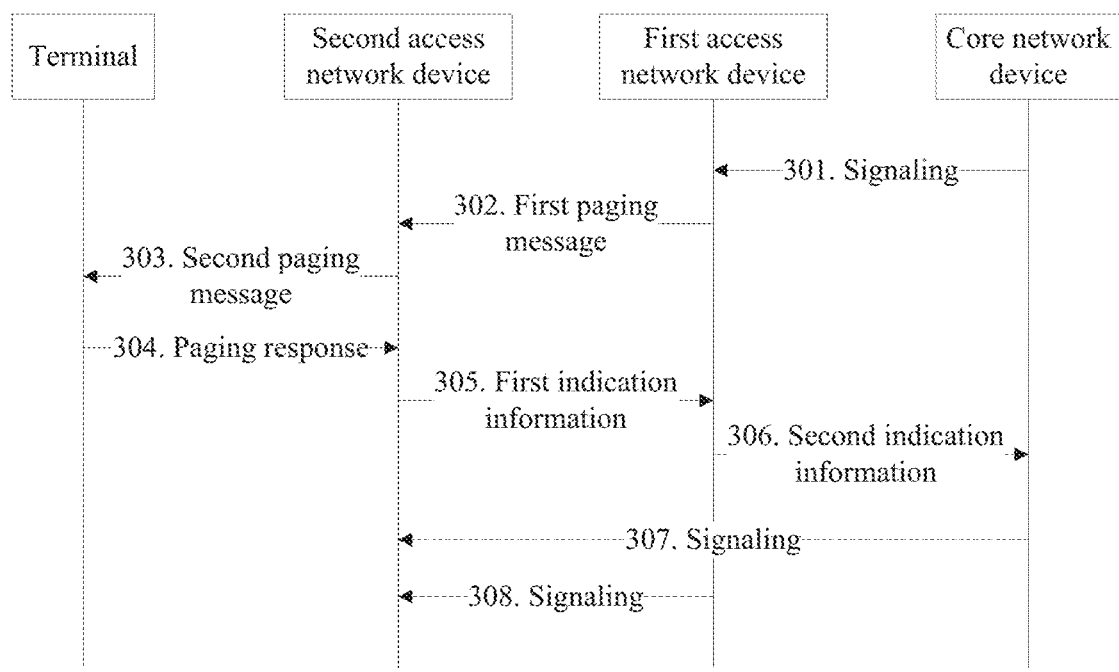
FIG. 3 is a schematic communication diagram of a communication method according to an embodiment of the present application.

The following describes the solution provided in an embodiment of the present application with reference to FIG. 3. The method in FIG. 3 is applied to a communication system. The communication system includes a paging area, there are at least a first access network device and a second access network device in the paging area, and there is a communication link between the first access network device and a core network device. The method includes steps 301 to 305.

Step 301. The core network device sends signaling to the first access network device. The signaling is signaling destined for a terminal.

In an example, the signaling may include at least one of the following: non-access stratum (NAS) signaling, radio bearer management signaling, terminal context modification signaling, terminal context deletion signaling, location report signaling, tracking signaling, or location service (LCS) signaling. The radio bearer management signaling may include at least one of radio bearer establishment signaling, radio bearer modification signaling, or radio bearer deletion signaling.

After receiving, from the core network device, the signaling destined for the terminal, the first access network device needs to send the signaling to the terminal. For example, after receiving a context modification command from the core network device, the first access network device may send an RRC reconfiguration command to the terminal based on the context modification command, to modify a context of the terminal. For another example, after receiving NAS signaling from the core network device, the first access network device may forward the NAS signaling to the terminal. However, before the first access network device sends the signaling to the terminal, the first access network device only knows that the terminal is in the paging area. Therefore, the first access network device needs to initiate paging to the terminal in the paging area, so that the terminal connects to a network. For example, the first access network device may directly initiate paging to the terminal, or may trigger the second access network device to initiate paging to the terminal.

Step 302. The first access network device sends a first paging message to the second access network device, where the first paging message is used to page a terminal.

In an example, the first access network device may send the first paging message to the second access network device when no paging response is received from the terminal. For example, after receiving the signaling from the core network device, the first access network device may first send a third paging message to the terminal, and when no paging response is received from the terminal within a period of time, send the first paging message to the second access network device. Optionally, before receiving the third paging message sent by the first access network device, the terminal may further receive configuration information sent by the first access network device, where the configuration information is used to instruct the terminal to enter a first mode.

Step 303. The second access network device sends a second paging message to the terminal.

In an example, before receiving the second paging message sent by the second access network device, the terminal may further receive configuration information sent by the first access network device, where the configuration information is used to instruct the terminal to enter a first mode.

Step 304. The second access network device receives a paging response from the terminal.

In an example, the second access network device may receive a location update message, an RRC connection restore request message, an RRC connection re-establishment message, or an RRC connection resume message from the terminal, where the location update message, the RRC connection restore request message, the RRC connection re-establishment message, or the RRC connection resume message carries the paging response. After receiving the paging response sent by the terminal, the second access network device may determine, based on the paging response, that the terminal is currently in coverage of the second access network device.

Step 305. The second access network device sends first indication information to the first access network device, where the first indication information is used to indicate that the terminal has connected to the second access network device. For example, the second access network device may send the first indication information to the first access network device based on the paging response sent by the terminal.

In an example, the first indication information may include an identifier of the terminal.

In an example, the second access network device may send a terminal information indication message to the first access network device, where the terminal information indication message carries the first indication information; or the second access network device may send a terminal context request message to the first access network device, where the terminal context request message carries the first indication information. In this case, the first access network device may determine, based on the terminal information indication message or the terminal context request message, that the terminal is currently in the coverage of the second access network device.

In an example, the terminal information indication message or the terminal context request message may further carry a data indication of the terminal, and the data indication is used to indicate whether the terminal has data to be sent.

Optionally, the method in FIG. 3 may further include step 306 and step 307, or the method in FIG. 3 may further include step 308.

Step 306. The first access network device sends second indication information to the core network device, where the second indication information is used to indicate that the terminal has moved out of coverage of the first access network device.

In an example, the first access network device may send a response message for the signaling to the core network device, where the response message carries the second indication information; or the first access network device may send a signaling failure message to the core network device, where the signaling failure message carries the second indication information, and is used to indicate that the signaling is not sent successfully.

In an example, the second indication information may include information about the second access network device or status information of the terminal, where the status information of the terminal is used to indicate a status of the terminal. For example, the status of the terminal may be: when the terminal moves within the paging area, an interface between the terminal and the core network device remains at the first access network device. For another example, the status of the terminal may be: the terminal maintains a connection context, and performs cell reselection based on mobility. For another example, the status of the terminal may be a lightly connected mode.

Step 307. The core network device sends the signaling to the second access network device.

In an example, before sending the signaling to the second access network device, the core network device may further receive a path switching request from the second access network device.

In an example, when the second indication information includes the information about the second access network device, the core network device may send the signaling to the second access network device based on the information about the second access network device. In this case, the core network device may determine, based on the information about the second access network device, that the terminal has moved into the coverage of the second access network device, and therefore may directly send the signaling to the second access network device.

In an example, when the second indication information includes the status information of the terminal, the core network device may further receive the path switching request from the second access network device before sending the signaling to the second access network device. In this case, the core network device may determine the status of the terminal based on the status information of the terminal, and send the signaling to the second access network device after receiving the path switching request sent by the second access network device.

In an example, the second access network device may further send the signaling to the terminal.

It can be learned from the above that when the first access network device sends the second indication information to the core network device, the core network device can learn that the terminal has moved out of the coverage of the first access network device, and send, to the second access network device, the signaling destined for the terminal, so that the signaling of the core network device is successfully sent, and proper subsequent processing is performed.

Step 308. The first access network device sends the signaling to the second access network device.

In an example, the first access network device may send a context transfer message to the second access network device, where the context transfer message carries the signaling.

In an example, the first access network device may further receive a first signaling processing indication from the second access network device, where the first signaling processing indication is used to indicate that processing of the signaling succeeds or fails. Further, the first access network device may further send a second signaling processing indication to the core network device, where the second signaling processing indication is used to indicate that processing of the signaling succeeds or fails.

In a possible implementation, the first access network device may receive a context transfer acknowledgment message from the second access network device, where the context transfer acknowledgment message carries the first signaling processing indication.

In an example, the second access network device may further send the signaling to the terminal.

It can be learned from the above that when learning that the terminal has moved from the first access network device to the second access network device, the first access network device may send the signaling to the second access network device, so that the second access network device sends the signaling to the terminal. In this way, the signaling of the core network device can be successfully sent, and proper subsequent processing can be performed.

Figure 4:
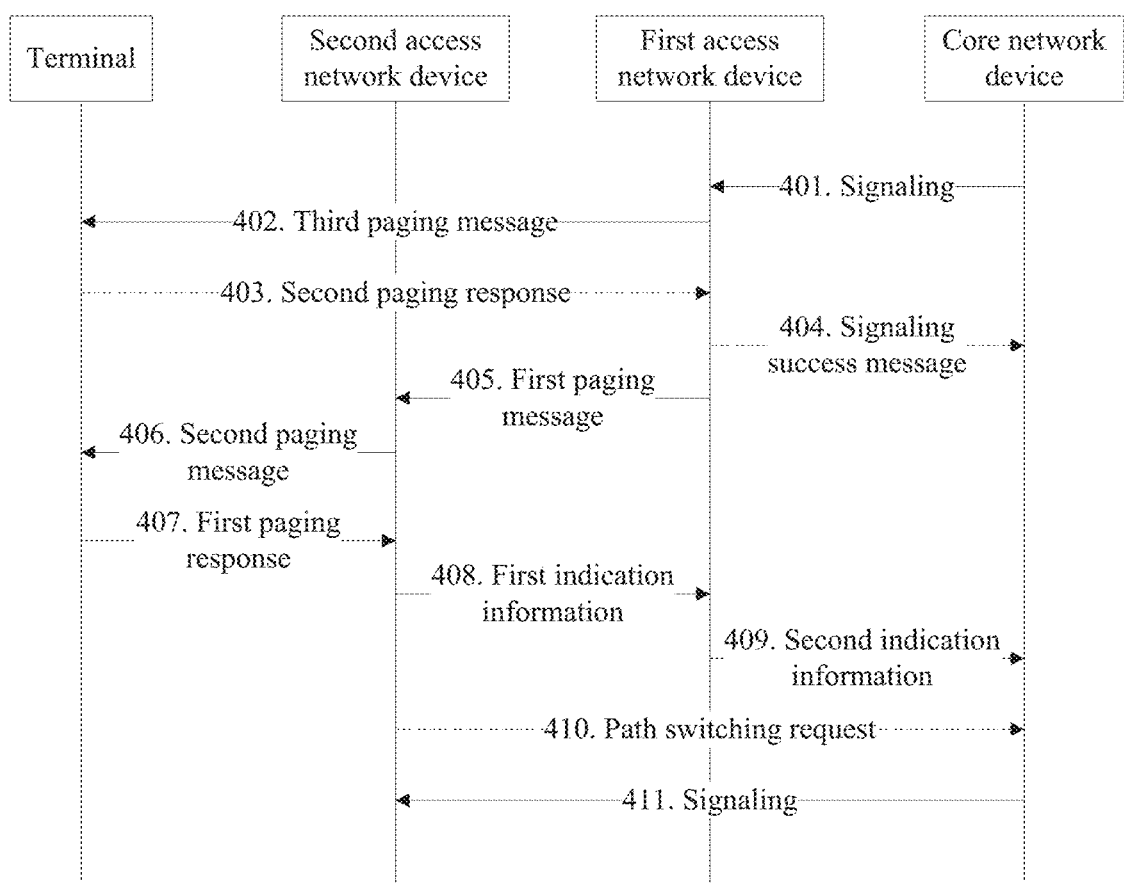
FIG. 4 is a schematic communication diagram of another communication method according to an embodiment of the present application.

Based on the method in FIG. 3, the following further describes the solution provided in an embodiment of the present application with reference to FIG. 4. In the method in FIG. 4, for content same as or similar to that in the method in FIG. 3, refer to the detailed descriptions of FIG. 3. Details are not described herein again.

Step 401. The core network device sends signaling to the first access network device. The signaling is signaling destined for a terminal.

For related content of the signaling, refer to the detailed descriptions of step 301 in FIG. 3. Details are not described herein again.

Step 402. The first access network device sends a third paging message to a terminal.

In an example, before receiving the third paging message sent by the first access network device, the terminal may further receive configuration information sent by the first access network device, where the configuration information is used to instruct the terminal to enter a first mode.

Step 403. The terminal sends a second paging response to the first access network device.

Step 404. The first access network device sends a signaling success message to the core network device.

After receiving the second paging response from the terminal, the first access network device may further initiate a reconfiguration procedure to the terminal based on the signaling.

It should be noted that step 403 and step 404 are optional steps. If step 403 and step 404 are performed, the method in FIG. 4 ends, and steps 405 to 411 are no longer performed. It can be understood that if step 405 and step 406 have been performed before step 403 is performed, steps 407 to 411 are no longer performed after step 403 and step 404 are performed. This is because the terminal has sent the second paging response to the first access network device in step 403, and usually does not send a first paging response to the second access network device. If step 403 and step 404 are not performed, step 405 is performed next.

Step 405. The first access network device sends a first paging message to the second access network device, where the first paging message is used to page the terminal.

Step 406. The second access network device sends a second paging message to the terminal.

In an example, before receiving the second paging message sent by the second access network device, the terminal may further receive configuration information sent by the first access network device, where the configuration information is used to instruct the terminal to enter a first mode.

Step 407. The terminal sends a first paging response to the second access network device.

Steps 408 and 409 are similar to steps 305 and 306 in FIG. 3, respectively, and reference may be made to the detailed descriptions of steps 305 and 306. Details are not described herein again.

Step 410. The second access network device sends a path switching request to the core network device.

It should be noted that step 410 is an optional step. When the second indication information includes the information about the second access network device, step 410 may or may not be performed. When the second indication information includes the status information of the terminal, step 410 is performed.

Step 411 is similar to step 307 in FIG. 3, and reference may be made to the detailed descriptions of step 307. Details are not described herein again.

In this embodiment of the present application, after receiving, from the core network device, the signaling destined for the terminal, the first access network device separately sends a paging message to the terminal and the second access network device. If a paging response is received from the terminal, the first access network device sends the signaling success message to the core network device. If the first indication information is received from the second access network device, the first access network device sends the second indication information to the core network device. After receiving the second indication information, the core network device can learn that the terminal has moved out of coverage of the first access network device, and therefore sends the signaling to the second access network device. In either case, the signaling of the core network device can be successfully sent, so that proper subsequent processing is performed.

Figure 5:
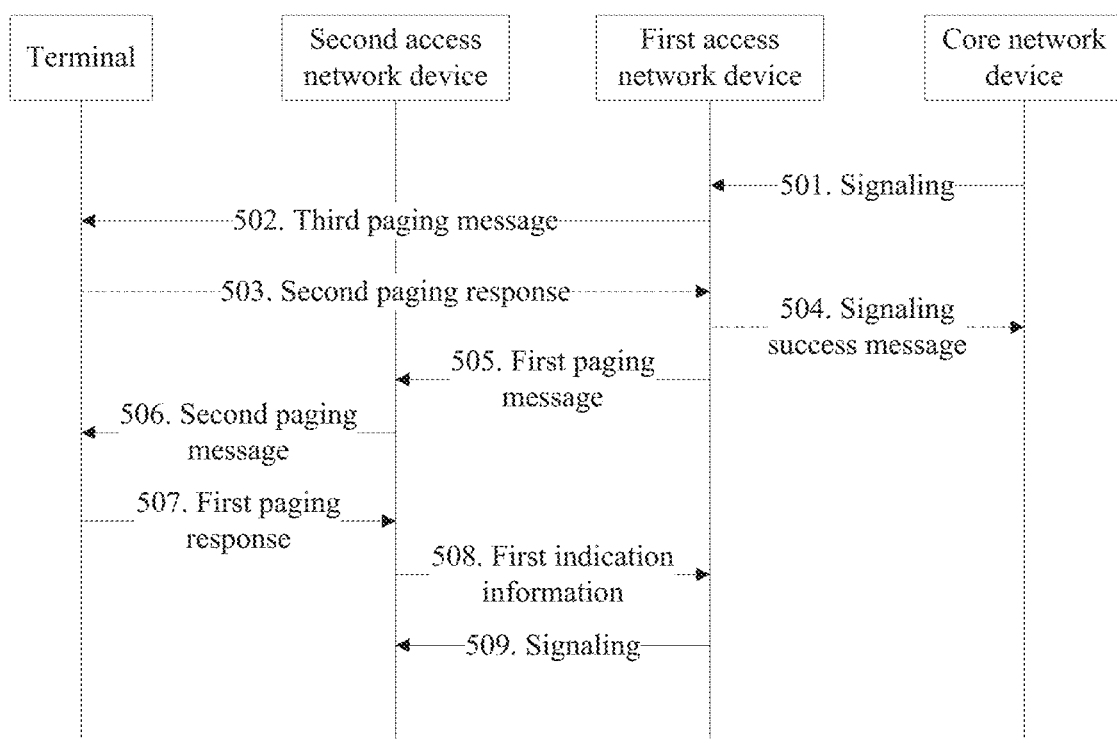
FIG. 5 is a schematic communication diagram of still another communication method according to an embodiment of the present application.

Based on the method in FIG. 3, the following further describes the solution provided in an embodiment of the present application with reference to FIG. 5. In the method in FIG. 5, for content same as or similar to that in the method in FIG. 3 or FIG. 4, refer to the detailed descriptions of FIG. 3 or FIG. 4. Details are not described herein again.

Steps 501 to 507 are similar to steps 401 to 407 in FIG. 4, respectively, and reference may be made to the detailed descriptions of steps 401 to 407. Details are not described herein again.

Steps 508 and 509 are similar to steps 305 and 308 in FIG. 3, respectively, and reference may be made to the detailed descriptions of steps 305 and 308. Details are not described herein again.

In this embodiment of the present application, after receiving, from the core network device, the signaling destined for the terminal, the first access network device separately sends a paging message to the terminal and the second access network device. If a paging response is received from the terminal, the first access network device sends the signaling success message to the core network device. If the first indication information is received from the second access network device, the first access network device sends the signaling to the second access network device. In either case, the signaling of the core network device can be successfully sent, so that proper subsequent processing is performed.

An embodiment of the present application further provides a communication method, and a device and a system based on the method. The method includes: receiving, by a terminal, configuration information from a first access network device; entering, by the terminal, a first mode based on the configuration information; sending, by the terminal, a message to a second access network device, where the message carries a first terminal identifier; sending, by the second access network device, the first terminal identifier to the first access network device: and sending, by the first access network device, a context of the terminal or a terminal suspension indication to the second access network device based on the first terminal identifier. In this embodiment of the present application, after moving from the first access network device to the second access network device, the terminal can send an identifier of the terminal to the second access network device, so that the second access network device receives the context of the terminal or the terminal suspension indication from the first access network device.

Figure 6:
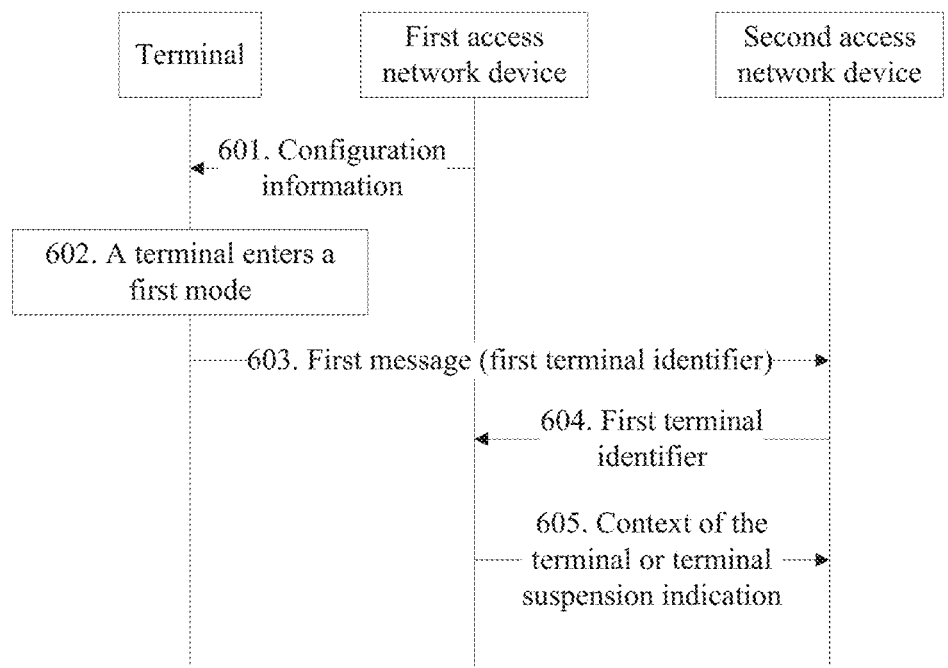
FIG. 6 is a schematic communication diagram of yet another communication method according to an embodiment of the present application.

The following describes the solution provided in an embodiment of the present application with reference to FIG. 6.

Step 601. A terminal receives configuration information from a first access network device.

In an example, the configuration information includes status indication information. The terminal may enter a first mode based on the status indication information.

In an example, the configuration information may include one or both of a paging area identifier and a paging area parameter. The terminal may enter the first mode based on one or both of the paging area identifier and the paging area parameter. The following briefly describes the paging area identifier and the paging area parameter.

The paging area identifier is used to identify a serving cell of the terminal in coverage of the first access network device. The terminal may determine, based on the paging area identifier, a paging area for the terminal in the first mode. For example, if a paging area identifier of the terminal in a current serving cell of the first access network device is 1, the paging area for the terminal in the first mode is a paging area 1, if a paging area identifier of the terminal in a current serving cell of the first access network device is 2, the paging area for the terminal in the first mode is a paging area 2, and so on. Certainly, there may be other implementations for a specific form of the paging area identifier. This is not limited in this embodiment of the present application.

The paging area parameter is used to determine paging area information for the terminal in the first mode. For example, the paging area parameter may include a paging area cell list, the paging area cell list includes at least one cell, and the terminal may use a cell in the paging area cell list as a paging area of the terminal. For another example, the paging area parameter includes a paging area identifier list, the paging area identifier list includes at least one paging area identifier, and the terminal may use a cell corresponding to a paging area identifier included in the paging area identifier list as a paging area of the terminal.

In an example, the configuration information may further include a first terminal identifier, where the first terminal identifier may be an identifier used by the terminal on a network in which the terminal is currently located. The terminal may store the first terminal identifier.

In an example, the configuration information may further include a first terminal identifier and a second terminal identifier. In this case, the first terminal identifier is an identifier used by the terminal on a first-standard network, and the second terminal identifier is an identifier used by the terminal on a second-standard network. For example, when the terminal is in the first-standard network, the terminal may perform paging listening in a paging area of the first-standard network by using the first terminal identifier. For another example, when the terminal is in the second-standard network, the terminal may perform paging listening in a paging area of the second-standard network by using the second terminal identifier. The first-standard network and the second-standard network use different radio access technologies. For example, the first-standard network uses a first access technology, and the second-standard network uses a second access technology. In a possible case, the first-standard network may be an LTE network or a 5G network, and the second-standard network may be a network of any standard different from the first-standard network.

In this example, the paging area cell list may include cells of at least two networks of different standards, or the paging area identifier list may include at least two paging area identifiers, and the two paging area identifiers correspond to cells of networks of different standards.

Step 602. The terminal enters a first mode.

Specifically, after the terminal enters the first mode, an interface between the terminal in the first mode and a core network device remains at the first access network device, and the terminal does not need to notify the first access network device when moving within a paging area, but notifies the first access network device when moving out of the paging area.

In an example, the terminal may alternatively determine the paging area information for the terminal in the first mode based on the paging area parameter.

Step 603. The terminal sends, to a second access network device, a message carrying a first terminal identifier.

For ease of description, the message carrying the first terminal identifier is referred to as a first message subsequently.

The first message may be used to instruct the second access network device to use the first terminal identifier of the terminal. Optionally, the first message may be an RRC connection restore request message, an RRC connection re-establishment message, a location update message, or an RRC connection resume message.

In an example, the terminal may send the first message to the second access network device when entering coverage of the second access network device.

In another example, the terminal may send the first message to the second access network device when receiving a paging message sent by the second access network device. For example, the second access network device is in the paging area of the terminal, and the terminal listens to a paging message sent by a cell of the second access network device. When the terminal receives the paging message for the terminal, the terminal sends the first message to the second access network device. In this example, the first message may also carry a paging response of the terminal.

In a possible implementation, the terminal may use the first terminal identifier to listen to the paging message. If the paging message carries the first terminal identifier, the terminal determines that the terminal is paged by the second access network device.

In another possible implementation, the configuration information further includes the second terminal identifier. In this case, as described in the example in step 601, the first terminal identifier and the second terminal identifier are identifiers used by the terminal in the first-standard network and the second-standard network, respectively. Optionally, the first access network device and the second access network device may use a same access technology or different access technologies. For example, the first access network device uses a first access technology, and the second access network device may use the first access technology or a second access technology. In one case, if the second access network device uses the first access technology, the first access network device sends the first terminal identifier to the second access network device. Correspondingly, the terminal currently camping on the second access network device listens to the paging message by using the first terminal identifier. If it is detected through listening that the paging message carries the first terminal identifier, the terminal determines that the terminal is paged by the second access network device. In another case, if the second access network device uses the second access technology, the first access network device sends the second terminal identifier to the second access network device. Correspondingly, the terminal currently camping on the second access network device listens to the paging message by using the second terminal identifier. If it is detected through listening that the paging message carries the second terminal identifier, the terminal determines that the terminal is paged by the second access network device.

In an example, the first message may also carry access technology type information. The access technology type information is used to inform the second access network device that a radio access technology used by the first access network device allocating the first terminal identifier to the terminal is the first access technology. Alternatively, the access technology type information is used to inform the second access network device that a radio access technology used by the first access network device allocating the first terminal identifier to the terminal is different from a radio access technology used by the second access network device.

In an example, the first message may also carry information indicating that the terminal is in the first mode. The second access network device may determine a status of the terminal based on the information.

In an example, the first message may also carry a sending indication. The sending indication is used to indicate whether the terminal has data and/or signaling to be sent. The second access network device may determine, according to the sending indication, whether the terminal has data and/or signaling to be sent.

In an example, the first message may also carry a paging area update indication. The second access network device may determine, according to the paging area update indication, that the terminal has moved out of the paging area. For example, in a scenario, the second access network device manages a plurality of cells, some of the plurality of cells belong to the paging area, and the other cells do not belong to the paging area. When the terminal moves to a cell that does not belong to the paging area, the terminal may send the paging area update indication to the second access network device by using the first message, so that the second access network device may determine, according to the paging area update indication, that the terminal has moved out of the paging area.

In an example, after sending the first message to the second access network device, the terminal may further receive a connection establishment indication sent by the second access network device. The terminal may send a tracking area update command to the core network device according to the connection establishment indication. Specifically, after receiving the first message, the second access network device may determine that there is no interface between the second access network device and the first access network device, and send the connection establishment indication to the terminal, to instruct the terminal to establish a new connection. The terminal may delete a stored connection context and establish a new connection according to the connection establishment indication, and then send the tracking area update command to the core network device by using the established new connection, so that the core network device releases a connection between a first access network device and the core network device based on the tracking area update command.

Step 604. The second access network device sends the first terminal identifier to the first access network device.

Specifically, the second access network device may determine, based on the first message, that the terminal has moved from the first access network device to the second access network device, thereby sending the first terminal identifier to the first access network device, so as to obtain a context of the terminal.

In an example, the first terminal identifier includes a terminal ID (identification) and an access network device ID. When the first message carries the access technology type information, the second access network device may determine, based on the first terminal identifier and the access technology type information, that an access network device that serves the terminal before the terminal moves into the coverage of the second access network device is the first access network device, so as to obtain the context of the terminal. Specifically, the second access network device may first determine, based on the access technology type information, a radio access technology used by the access network device that serves the terminal before the terminal moves, then determines, in a network using the radio access technology and by using the access network device ID, that the access network device that serves the terminal before the terminal moves is the first access network device, and finally obtains the context of the terminal from the first access network device by using the terminal ID.

In an example, the second access network device may send the first terminal identifier to the first access network device by using a message. For ease of description, the message is referred to as a second message. For example, the second message may be a terminal information indication message, a terminal location update message, or a context request message. In a possible implementation, the second access network device may determine, depending on whether the first message carries information indicating that the terminal is in the first mode, a message used to send the first terminal identifier to the first access network device. For example, if the first message carries the information indicating that the terminal is in the first mode, a second access network device sends the first terminal identifier to the first access network device by using the terminal information indication message or the terminal location update message. Alternatively, if the first message does not carry the information indicating that the terminal is in the first mode, a second access network device sends the first terminal identifier to the first access network device by using the context request message.

In an example, when the first message carries the information indicating that the terminal is in the first mode, the second access network device may further add, to the second message, the information indicating that the terminal is in the first mode, so that the first access network device determines a current mode of the terminal based on the information.

In an example, when the first message carries the sending indication, the second access network device may further add the sending indication to the second message, so that the first access network device determines, according to the sending indication, whether the terminal currently has data and/or signaling to be sent.

In an example, when the first message carries the paging area update indication, the second access network device may further add the paging area update indication to the second message, so that the first access network device determines, according to the paging area update indication, whether the terminal has moved out of the paging area.

Step 605. The first access network device sends a context of the terminal or a terminal suspension indication to the second access network device based on the first terminal identifier.

In an example, the first access network device may send a context transfer message to the second access network device, where the context transfer message carries the context of the terminal. The context transfer message may also be referred to as a context migration message. For example, the context migration message may be a handover message or a context response message.

In an example, if determining to switch the terminal to a suspended mode, the first access network device may send the terminal suspension indication to the second access network device. The suspended mode means that the interface between the terminal and the core network device remains at the first access network device but the interface is deactivated. After receiving the terminal suspension indication, the second access network device may send a suspension command to the terminal according to the terminal suspension indication.

In an example, the first access network device may determine the status of the terminal based on a type of the second message. For example, when the second message is the terminal information indication message or the terminal location update message, the first access network device may determine that the terminal is in the first mode. Further, if the first access network device determines that the terminal is in the first mode, the first access network device may perform a context migration procedure or a suspension procedure, and send the context of the terminal or the terminal suspension indication to the second access network device.

In a possible implementation, the first access network device may determine, depending on whether the second message carries the sending indication or the paging area update indication, whether to perform a context migration procedure or a suspension procedure. For example, if the second message carries the sending indication, the first access network device performs the context migration procedure. For another example, if the second message does not carry the sending indication, the first access network device performs the suspension procedure. For another example, if the second message carries the paging area update indication, the first access network device performs the suspension procedure.

In an example, the first access network device may determine the status of the terminal depending on whether the second message carries the information indicating that the terminal is in the first mode. For example, when the second message carries the information indicating that the terminal is in the first mode, the first access network device may determine that the terminal is in the first mode. Further, if the first access network device determines that the terminal is in the first mode, the first access network device may perform the context migration procedure or the suspension procedure, and send the context of the terminal or the terminal suspension indication to the second access network device. A specific implementation of performing the context migration procedure or the suspension procedure by the first access network device is similar to the implementation process of the context migration procedure or the suspension procedure in the previous example. For details, refer to the detailed descriptions of the previous example. Details are not described here again.

The solutions provided in the embodiments of the present application have been described above mainly from a perspective of interaction between different network elements. It can be understood that to implement the foregoing functions, the first access network device, the second access network device, the core network device, and the terminal include corresponding hardware structures and/or software modules for performing the functions. The units and algorithm steps in the examples described with reference to the embodiments disclosed in the present application may be implemented by hardware or a combination of hardware and computer software in the embodiments of the present application. Whether a function is performed by hardware or computer software driving hardware depends on particular applications and design constraints of the technical solutions. For each particular application, different methods may be used to implement the described functions, but it should not be considered that the implementation goes beyond the scope of the technical solutions in the embodiments of the present application.

In the embodiments of the present application, function unit division may be performed on the first access network device, the second access network device, the core network device, the terminal, and the like based on the foregoing method examples. For example, division of function units may be based on various functions, or two or more functions may be integrated into one processing unit. The integrated unit may be implemented in a form of hardware, or may be implemented in a form of a software function unit. It should be noted that the unit division in the embodiments of the present application is an example and merely logical function division, and may be other division in actual implementation.

Figure 7:
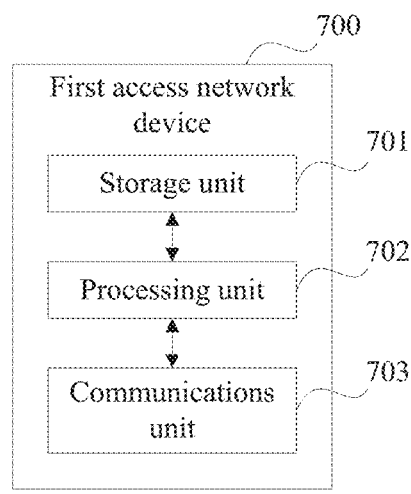
FIG. 7 is a block diagram of a first access network device according to an embodiment of the present application.

FIG. 7 is a block diagram of a first access network device whose units are integrated according to an embodiment of the present application. A first access network device 700 includes a processing unit 702 and a communication unit 703. The processing unit 702 is configured to control and manage an action of the first access network device 700. For example, the processing unit 702 is configured to enable the first access network device 700 to perform the steps 302, 306, and 308 in FIG. 3, the steps 402, 404, 405, and 409 in FIG. 4, the steps 502, 504, 505, and 509 in FIG. 5, the steps 601 and 605 in FIG. 6, and/or another process used in the technology described in this specification. The communication unit 703 is configured to enable the first access network device 700 to communicate with another network element (for example, a second access network device or a core network device). The first access network device 700 may further include a storage unit 701, configured to store program code and data of the first access network device 700.

The processing unit 702 may be a processor or a controller. The communication unit 703 may be a communication interface, a transceiver, a transceiver circuit, or the like. The communication interface is a collective name. In specific implementation, the communication interface may include a plurality of interfaces, for example, an interface between access network devices, an interface between an access network device and a core network device, and/or another interface. The storage unit 701 may be a memory.

Figure 8:
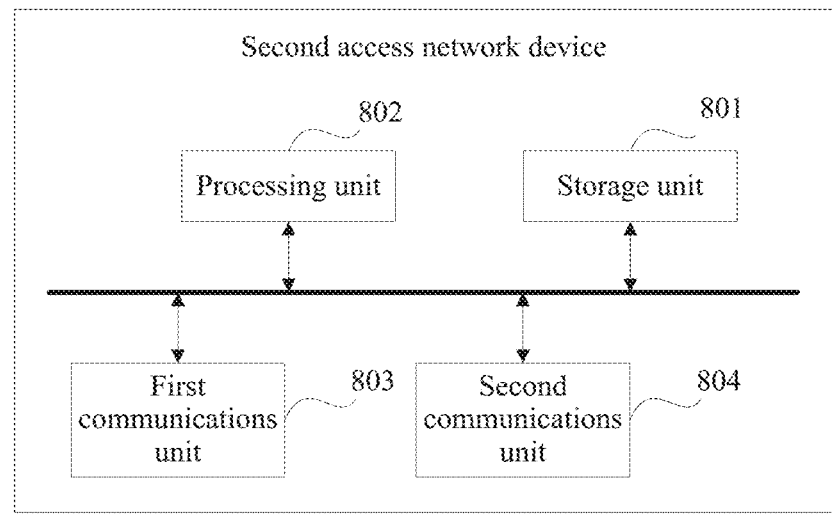
FIG. 8 is a block diagram of a second access network device according to an embodiment of the present application.

FIG. 8 is a simplified block diagram of a second access network device whose units are integrated according to an embodiment of the present application. A second access network device 800 includes a processing unit 802, a first communication unit 803, and a second communication unit 804. The processing unit 802 is configured to control and manage an action of the second access network device 800. For example, the processing unit 802 is configured to enable the second access network device 800 to perform the steps 303 and 305 in FIG. 3, the steps 406, 408, and 410 in FIG. 4, the steps 506 and 508 in FIG. 5, the step 604 in FIG. 6, and/or another process used in the technology described in this specification. The first communication unit 803 is configured to enable the second access network device 800 to communicate with another access network device or a core network device. The second communication unit 804 is configured to enable the second access network device 800 to communicate with a terminal. The second access network device 800 may further include a storage unit 801, configured to store program code and data of the second access network device 800.

The processing unit 802 may be a processor or a controller. The first communication unit 803 may be a communication interface. The communication interface is a collective name. In specific implementation, the communication interface may include a plurality of interfaces, for example, an interface between access network devices, an interface between an access network device and a core network device, and/or another interface. The second communication unit may be a transceiver, a transceiver circuit, or the like. The storage unit 801 may be a memory.

Figure 9:
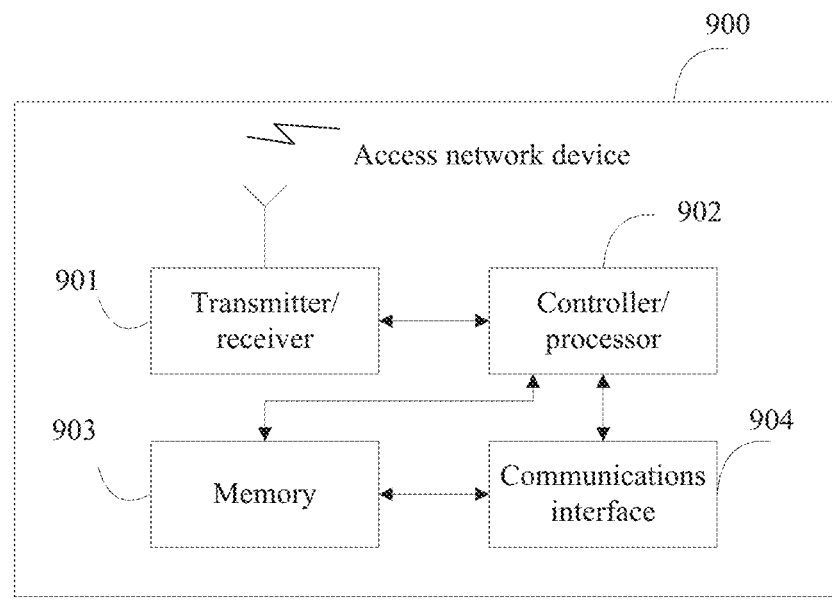
FIG. 9 is a simplified structural diagram of an access network device according to an embodiment of the present application.

When the processing unit 702 is a processor, the communication unit 703 is a communication interface, and the storage unit 701 is a memory, a structure of the first access network device in this embodiment of the present application may be an access network device structure shown in FIG. 9. When the processing unit 802 is a processor, the first communication unit 803 is a communication interface, the second communication unit 804 is a transmitter/receiver, and the storage unit 801 is a memory, a structure of the second access network device in this embodiment of the present application may also be the access network device structure shown in FIG. 9.

FIG. 9 is a possible simplified structural diagram of an access network device according to an embodiment of the present application.

An access network device 900 includes a processor 902 and a communication interface 904. The processor 902 may also be a controller, and is represented as "controller/processor 902" in FIG. 9. The communication interface 904 is configured to enable the access network device to communicate with another network element (for example, another access network device or a core network device). Further, the access network device 900 may further include a transmitter/receiver 901. The transmitter/receiver 901 is configured to support information transmission and reception between the access network device and the terminal in the foregoing embodiments, and support radio communication between the terminal and another terminal. The processor 902 performs various functions for communicating with the terminal. On an uplink, an uplink signal from the terminal is received by an antenna, is demodulated (for example, a high frequency signal is demodulated into a baseband signal) by the receiver 901, and is further processed by the processor 902 to restore service data and signaling information sent by the terminal. On a downlink, service data and a signaling message are processed by the processor 902, and are modulated (for example, a baseband signal is modulated into a high frequency signal) by the transmitter 901 to generate a downlink signal, and the downlink signal is transmitted to the terminal by using an antenna. It should be noted that the foregoing demodulation or modulation function may alternatively be performed by the processor 902.

For example, when the access network device 900 is a first access network device, the processor 902 is further configured to perform the processing processes of the first access network device in the methods in FIG. 3 to FIG. 6 and/or another process in the technical solutions described in this application. Alternatively, when the access network device 900 is a second access network device, the processor 902 is further configured to perform the processing processes of the second access network device in the methods in FIG. 3 to FIG. 6 and/or another process in the technical solutions described in this application.

Further, the access network device 900 may further include a memory 903. The memory 903 is configured to store program code and data of the access network device 900.

FIG. 9 shows merely a simplified design of the access network device 900. In actual application, the access network device 900 may include any quantities of transmitters, receivers, processors, controllers, memories, communication units, and the like. All access network devices that can implement the embodiments of the present application shall fall within the protection scope of the embodiments of the present application.

Figure 10:
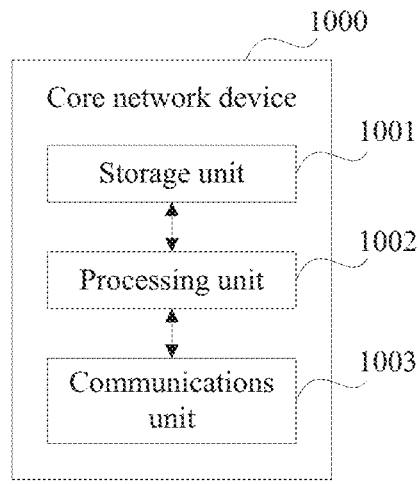
FIG. 10 is a block diagram of a core network device according to an embodiment of the present application.

FIG. 10 is a possible block diagram of a core network device whose units are integrated according to an embodiment of the present application. A core network device 1000 includes a processing unit 1002 and a communication unit 1003. The processing unit 1002 is configured to control and manage an action of the core network device. For example, the processing unit 1002 is configured to enable the core network device to perform the steps 301 and 307 in FIG. 3, the steps 401 and 410 in FIG. 4, the step 501 in FIG. 5, and/or another process used in the technology described in this specification. The communication unit 1003 is configured to enable the core network device to communicate with another network entity. The core network device may further include a storage unit 1001, configured to store program code and data of the core network device.

The processing unit 1002 may be a processor or a controller, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or a combination thereof. The processing unit 1002 may implement or execute various example logical blocks, modules, and circuits described with reference to the content disclosed in the present application. Alternatively, the processing unit 1002 may be a combination of processors implementing a computing function, for example, a combination of one or more microprocessors, or a combination of a DSP and a microprocessor. The communication unit 1003 may be a communication interface, a transceiver, a transceiver circuit, or the like. The communication interface is a collective name. In specific implementation, the communication interface may include a plurality of interfaces, for example, an interface between a core network device and an access network device, and/or another interface. The storage unit 1001 may be a memory.

Figure 11:
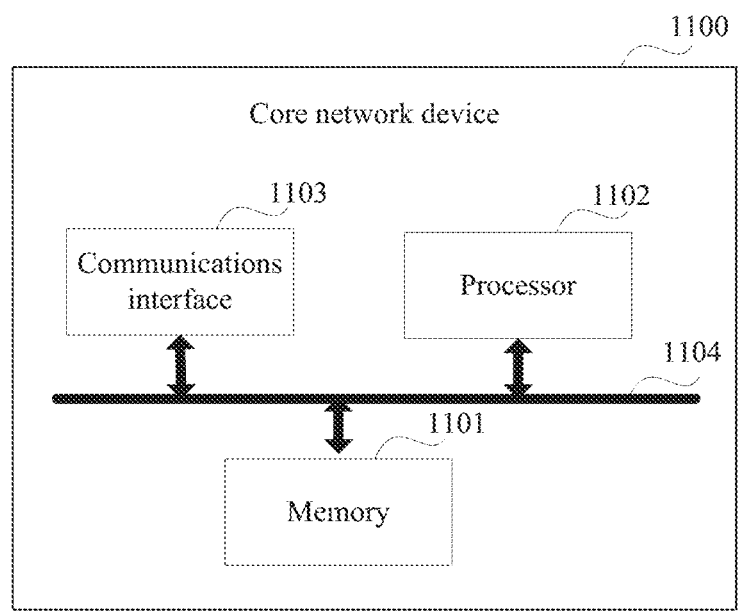
FIG. 11 is a simplified structural diagram of a core network device according to an embodiment of the present application.

When the processing unit 1002 is a processor, the communication unit 1003 is a communication interface, and the storage unit 1001 is a memory, the core network device in this embodiment of the present application may be a core network device 1100 shown in FIG. 11.

Referring to FIG. 11, the core network device 1100 includes a processor 1102, a communication interface 1103, and a memory 1101. Optionally, the core network device 1100 may further include a bus 1104. The communication interface 1103, the processor 1102, and the memory 1101 may be connected to each other by using the bus 1104. The bus 1104 may be a peripheral component interconnect (PCI) bus, an extended industry standard architecture (EISA) bus, or the like. The bus 1104 may be classified into an address bus, a data bus, a control bus, and the like. For ease of representation, only one thick line is used to represent the bus in FIG. 11, but this does not mean that there is only one bus or only one type of bus.

Figure 12:
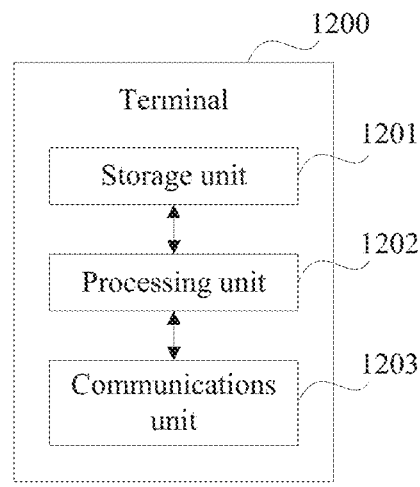
FIG. 12 is a block diagram of a terminal according to an embodiment of the present application.

FIG. 12 is a possible schematic block diagram of a terminal whose units are integrated according to an embodiment of the present application. A terminal 1200 includes a processing unit 1202 and a communication unit 1203. The processing unit 1202 is configured to control and manage an action of the terminal 1200. For example, the processing unit 1202 is configured to enable the terminal 1200 to perform the step 304 in FIG. 3, the steps 403 and 407 in FIG. 4, the steps 503 and 507 in FIG. 5, the steps 602 and 603 in FIG. 6, and/or another process used in the technology described in this specification. The communication unit 1203 is configured to enable the terminal 1200 to communicate with another network element. The terminal 1200 may further include a storage unit 1201, configured to store program code and data of the terminal 1200.

Figure 13:
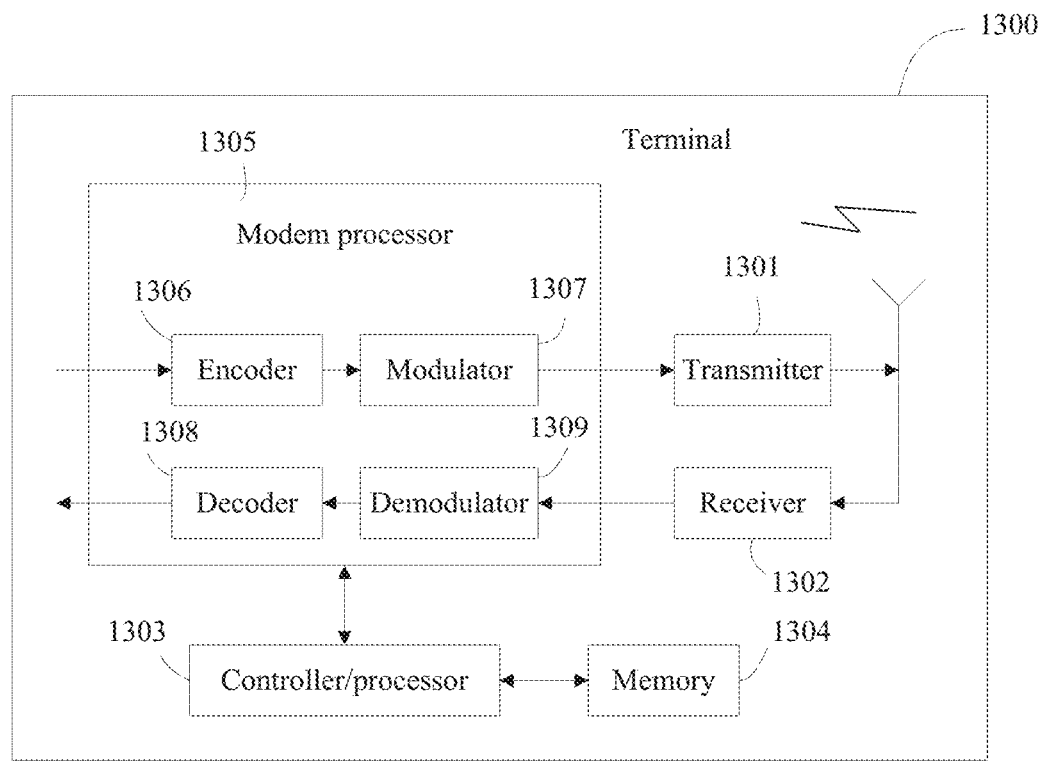
FIG. 13 is a simplified structural diagram of a terminal according to an embodiment of the present application.

When the processing unit 1202 is a processor, the communication unit 1203 is a communication interface, and the storage unit 1201 is a memory, the terminal in this embodiment of the present application may be a terminal shown in FIG. 13.

FIG. 13 is a simplified schematic diagram of a possible design structure of a terminal according to an embodiment of the present application. A terminal 1300 includes a transmitter 1301, a receiver 1302, and a processor 1303. The processor 1303 may also be a controller, and is represented as "controller/processor 1303" in FIG. 13. Optionally, the terminal 1300 may further include a modem processor 1305. The modem processor 1305 may include an encoder 1306, a modulator 1307, a decoder 1308, and a demodulator 1309.

In an example, the transmitter 1301 adjusts (for example, digital-analog converts, filters, amplifies, and up-converts) an output sample and generates an uplink signal. The uplink signal is transmitted to the base station in the foregoing embodiments by using an antenna. On a downlink, an antenna receives a downlink signal transmitted by the base station in the foregoing embodiments. The receiver 1302 regulates (for example, filters, amplifies, down-converts, and digitizes) the signal received from the antenna and provides an input sample. On the modem processor 1305, the encoder 1306 receives service data and a signaling message that are to be sent on an uplink, and processes (for example, formats, encodes, and interleaves) the service data and the signaling message. The modulator 1307 further processes (for example, performs symbol mapping on and modulates) the encoded service data and signaling message and provides an output sample. The demodulator 1309 processes (for example, demodulates) the input sample and provides symbol estimation. The decoder 1308 processes (for example, de-interleaves and decodes) the symbol estimation and provides the decoded data and signaling message that are to be sent to the terminal 1300. The encoder 1306, the modulator 1307, the demodulator 1309, and the decoder 1308 may be implemented by the combined modem processor 1305. These units perform processing based on a radio access technology (for example, an access technology used by an LTE system and another evolved system) used by a radio access network. It should be noted that when the terminal 1300 does not include the modem processor 1305, the foregoing functions of the modem processor 1305 may also be performed by the processor 1303.

The processor 1303 controls and manages an action of the terminal 1300 and is configured to perform the processing process implemented by the terminal in the foregoing embodiments of the present application. For example, the processor 1303 is further configured to perform the processing process of the terminal in the methods in FIG. 3 to FIG. 6 and/or another process in the technical solutions described in this application.

Further, the terminal 1300 may further include a memory 1304. The memory 1304 is configured to store program code and data of the terminal 1300.

Methods or algorithm steps described with reference to the content disclosed in the embodiments of the present application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a constituent component of the processor. The processor and the storage medium may be located in an ASIC. In addition, the ASIC may be located in a base station or a terminal. Certainly, the processor and the storage medium may exist m a base station or terminal as discrete components.

In the foregoing one or more examples, the functions described in the embodiments of the present application may be implemented by hardware, software, firmware, or any combination thereof. When the functions are implemented by software, these functions may be stored in a computer-readable medium or transmitted as one or more instructions or code in a computer-readable medium. The computer-readable medium includes a computer storage medium and a communication medium. The communication medium includes any medium that enables a computer program to be transmitted from one place to another. The storage medium may be any available medium accessible to a general-purpose or dedicated computer.

In the foregoing specific implementations, the objectives, technical solutions, and beneficial effects of the embodiments of the present application are further described in detail. It should be understood that the foregoing descriptions are merely specific implementations of the embodiments of the present application, but are not intended to limit the protection scope of the embodiments of present application. Any modification, equivalent replacement, or improvement made based on technical solutions in the embodiments of the present application shall fall within the protection scope of the embodiments of the present application.

The invention claimed is:

1. A communication method, comprising
receiving, by a terminal device, configuration information from a first access network device, wherein the configuration information comprises paging area information configured for the terminal device in a radio resource control (RRC) inactive mode;
entering, by the terminal device, the RRC inactive mode wherein connection context for a connection between the terminal device and the first access network device is stored by the terminal device as stored connection context;
sending, by the terminal device, a first message to a second access network device when the terminal device is in a cell that does not belong to a paging area corresponding to the paging area information and the cell is managed by the second access network device, wherein the first message comprises a paging area update indication;
receiving, by the terminal device, a connection establishment indication from the second access network device; deleting, by the terminal device in response to the connection establishment indication, the stored connection context;
establishing, by the terminal device, a new connection between the terminal device and the second access network device;
sending, by the terminal device, a second message to a core network device using the new connection between the terminal device and the second access network device; and
releasing, by the core network device in response to the second message, a connection between the first access network device and the core network device established for the terminal device.

2. The method according to claim 1, wherein the paging area information comprises one or both of a list of one or more paging area cell and a list of one or more paging area identifier.

3. The method according to claim 1, wherein the first message is a RRC connection resume message.

4. A communication method, comprising:
receiving, by a first access network device from a core network device, signaling for a terminal device in a radio resource control (RRC) inactive mode; and
sending, by the first access network device, a first paging message to a second access network device for paging the terminal device;
sending, by a second access network device, a second paging message to the terminal device after receiving the first paging message;

receiving, by the second access network device, a paging response from the terminal device;

sending, by the second access network device, first indication information to the first access network device, wherein the first indication information indicates that the terminal device has connected to the second access network device; and sending, by the first access network device, second indication information to the core network device, to indicate that the terminal device has connected to a different access network device than the first access network device, wherein the second indication information is carried in a signaling failure message, and the signaling failure message indicates that the signaling is not sent to the terminal successfully.

5. The method according to claim 4, wherein the method further comprising:

sending, by the first access network device, the signaling destined for the terminal device to the second access network device.

6. The method according to claim 4, wherein the method further comprising:

sending, by the first access network device, second indication information to the core network device, to indicate that the terminal device has connected to an access network device different from the first access network device.

7. The method according to claim 6, wherein the second indication information is comprised in a signaling failure message, and wherein the signaling failure message indicates that the signaling has not been successfully sent to the terminal device.

8. The method according to claim 6, wherein the access network device different from the first access network device is the second access network device, and wherein the second indication information comprises one or both of the following:

information about the second access network device, and status information of the terminal device.

9. The method according to claim 4, wherein the method further comprising: sending, by the first access network device, configuration information to the terminal device, wherein the configuration information instructs the terminal device to turn into the RRC inactive mode.

10. The method according to claim 4, wherein the signaling for the terminal device is one or more of the following:

non-access stratum (NAS) signaling,
radio bearer management signaling,
terminal context modification signaling,
terminal context deletion signaling,
location report signaling,
tracking signaling, and
location service (LCS) signaling.

11. The method according to claim 4, further comprising: sending, by the core network device, the signaling for the terminal device in the RRC inactive mode.

12. A system, comprising a terminal device and a core network device, wherein:

the terminal device is configured to:
receive configuration information from a first access network device, wherein the configuration information comprises paging area information configured for the terminal device in a radio resource control (RRC) inactive mode;
enter the RRC inactive mode, wherein connection context for a connection between the terminal device and the first access network device is stored by the terminal device as stored connection context;
send a first message to a second access network device when the terminal device is in a cell that does not belong to a paging area corresponding to the paging area information and the cell is managed by the second access network device, wherein the first message comprises a paging area update indication;
receive a connection establishment indication from the second access network device;
delete, in response to the connection establishment indication, the stored connection context;
establish a new connection between the terminal device and the second access network device; and
send a second message to a core network device using the new connection between the terminal device and the second access network device; and
the core network device is configured to:
release, in response to the second message, a connection between the first access network device and the core network device established for the terminal device.

13. The system according to claim 12, wherein the paging area information comprises one or both of a list of one or more paging area cell and a list of one or more paging area identifier.

14. The system according to claim 12, wherein the first message is a RRC connection resume message.

15. An apparatus in a communication device, comprising one or more processing circuits that are configured to cause the communication device to:

receive configuration information from a first access network device, wherein the configuration information comprises paging area information configured for the communication device in a radio resource control (RRC) inactive mode;
enter the RRC inactive mode wherein connection context for a connection between the communication device and the first access network device is stored by the communication device as stored connection context;
send a first message to a second access network device when the communication device is in a cell that does not belong to a paging area corresponding to the paging area information and the cell is managed by the second access network device, wherein the first message comprises a paging area update indication;
receive a connection establishment indication from the second access network device; deleting, by the communication device in response to the connection establishment indication, the stored connection context;
establish a new connection between the communication device and the second access network device;
send a second message to a core network device using the new connection between the communication device and the second access network device; and
release in response to the second message, a connection between the first access network device and the core network device established for the communication device.

16. A terminal device, comprising: one or more processors, a transceiver, and a memory storing program codes for execution by the one or more processors to cause the terminal device to:

receive configuration information from a first access network device, wherein the configuration information comprises paging area information configured for the terminal device in a radio resource control (RRC) inactive mode;

enter the RRC inactive mode wherein connection context for a connection between the terminal device and the first access network device is stored by the terminal device as stored connection context;

send a first message to a second access network device when the terminal device is in a cell that does not belong to a paging area corresponding to the paging area information and the cell is managed by the second access network device, wherein the first message comprises a paging area update indication;

receive a connection establishment indication from the second access network device; deleting, by the terminal device in response to the connection establishment indication, the stored connection context;

establish a new connection between the terminal device and the second access network device;

send a second message to a core network device using the new connection between the terminal device and the second access network device; and release in response to the second message, a connection between the first access network device and the core network device established for the terminal device.

* * * * *

UNITED STATES PATENT AND TRADEMARK OFFICE
CERTIFICATE OF CORRECTION

| | |
|---|---|
| PATENT NO. | : 11,832,215 B2 |
| APPLICATION NO. | : 17/882383 |
| DATED | : November 28, 2023 |
| INVENTOR(S) | : Jun Du and Bingzhao Li |

It is certified that error appears in the above-identified patent and that said Letters Patent is hereby corrected as shown below:

In the Claims

Column 25, Line 15, Claim 4, before "successfully." insert therefore -- device --.

Signed and Sealed this
Fourth Day of June, 2024

Katherine Kelly Vidal
*Director of the United States Patent and Trademark Office*